June 6, 1961 E. SCHASCHL 2,987,685
CORROSION TEST PROBE
Filed Aug. 15, 1956 4 Sheets-Sheet 1

INVENTOR
EDWARD SCHASCHL
BY
*Edward H. Lang*
ATTORNEY

June 6, 1961 E. SCHASCHL 2,987,685
CORROSION TEST PROBE
Filed Aug. 15, 1956 4 Sheets-Sheet 2

INVENTOR
EDWARD SCHASCHL
BY *Edward H. Lang*
ATTORNEY

June 6, 1961 E. SCHASCHL 2,987,685
CORROSION TEST PROBE

Filed Aug. 15, 1956 4 Sheets-Sheet 3

INVENTOR
EDWARD SCHASCHL
BY Edward W Fang
ATTORNEY

June 6, 1961  E. SCHASCHL  2,987,685
CORROSION TEST PROBE
Filed Aug. 15, 1956  4 Sheets-Sheet 4

THE EFFECT OF AN INHIBITOR ON THE CORROSION OF STEEL, ALTERNATELY IMMERSED IN GASOLINE AND BRINE, AS MEASURED BY THE TEST PROBE.

CORROSION OF STEEL IN AERATED DISTILLED WATER AS MEASURED BY THE TEST PROBE.

INVENTOR
EDWARD SCHASCHL
BY
ATTORNEY

United States Patent Office 2,987,685
Patented June 6, 1961

2,987,685
CORROSION TEST PROBE
Edward Schaschl, Crystal Lake, Ill., assignor to The Pure Oil Company, Chicago, Ill., a corporation of Ohio
Filed Aug. 15, 1956, Ser. No. 604,205
9 Claims. (Cl. 338—10)

This invention relates to a corrosion testing apparatus. It more specifically is concerned with an apparatus whereby the corrosion of metallic materials of construction may be readily determined in terms of metal loss. This application is a continuation-in-part of U.S. patent application, Serial Number 568,906 filed March 1, 1956, now U.S. Patent 2,851,570.

In solving or observing specific plant corrosion problems, corrosion testing carried out in the operating equipment provides the most acceptable and reliable method. By observing the influence of corrosion under actual service conditions, the heterogeneity of corrosive environment is taken into consideration. This cannot be readily done using laboratory testing methods because of the wide variety of known, as well as unknown, variables which may have an influence on the corrosion rate of a metallic material of construction. The test procedures for carrying out plant equipment tests vary from the simplest form, which consists essentially of exposing a metallic specimen in the corrosive environment on a simple type of hanger, to a more elaborate procedure which gives more reliable results and makes use of a specimen holder in which a number of test pieces are supported on insulating materials so that galvanic contacts are precluded. Such procedures have found wide use in making corrosion studies. In conducting plant corrosion tests using these test methods, it is necessary that the specimens be weighed, because loss of weight in a method of this nature is the principal criterion of corrosion. This method is satisfactory if the specimens are installed in conveniently accessible locations which facilitate the handling of the specimens which are being examined. However, a method of this nature cannot be employed in process vessels which are positioned in inaccessible places in the plant. Furthermore, results observed from weight-loss methods are subject to error due to the incomplete removal of the corrosion products and because of loss of uncorroded metal in preparing the corroded specimens for weighing. In addition, a large number of specimens are necessary to determine properly a time-corrosion curve.

It is known that there is a correlation between change in electrical conductivity and change in cross-sectional area. This change in cross-sectional area can be used in studying the influence of the environment on the corrosion of a metallic specimen. This method of determining the amount of corrosion is advantageous because it produces little or no disturbance of the specimen during the testing period and, therefore, is well-adapted for the measurement of time-corrosion curves. In addition, by employing corrosion test procedures of this nature, the test specimens may be placed in process vessels and the measurements made at a point remote from the position of the process vessel.

It is, therefore, a primary object of this invention to provide an apparatus which will facilitate corrosion studies in process vessels which are not conveniently located to permit access thereto for visual observation or use of weight-measuring techniques. It is also an object of this invention to measure changes in electrical resistance in assessing the influence of corrosion by means of an apparatus which is self-compensating for changes in temperature.

Figure 9:
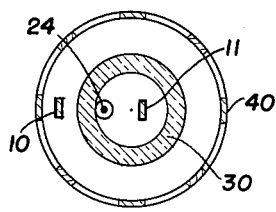
Figure 10:
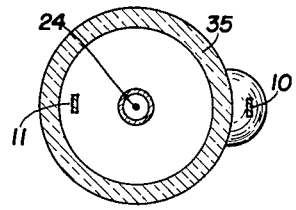
Figure 7:
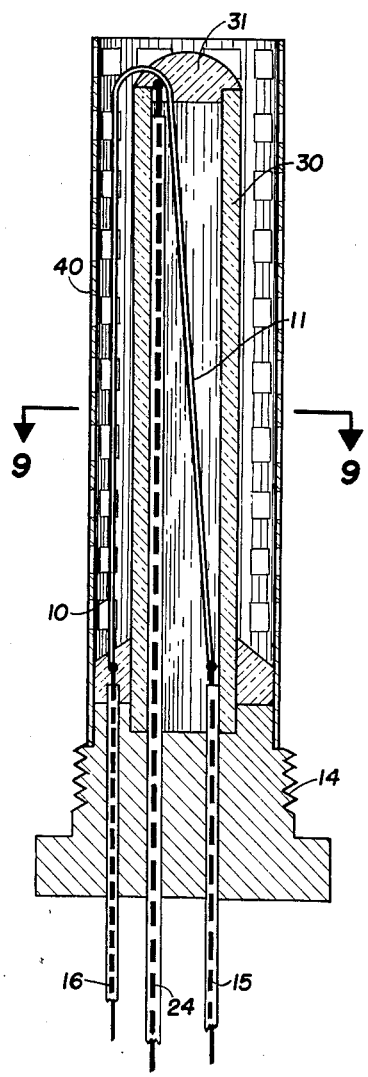
Figure 8:
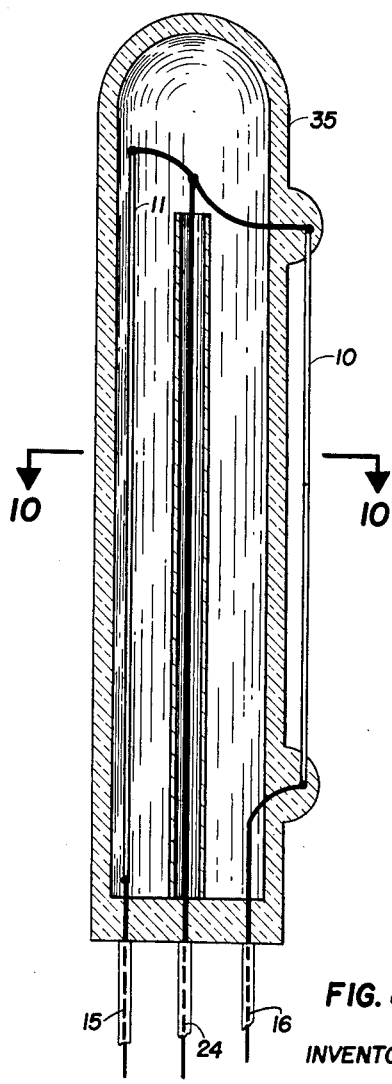

FIGURES 9 and 10 are cross-sectional views of FIGURES 7 and 8 through lines 9—9 and 10—10.

Figure 12:
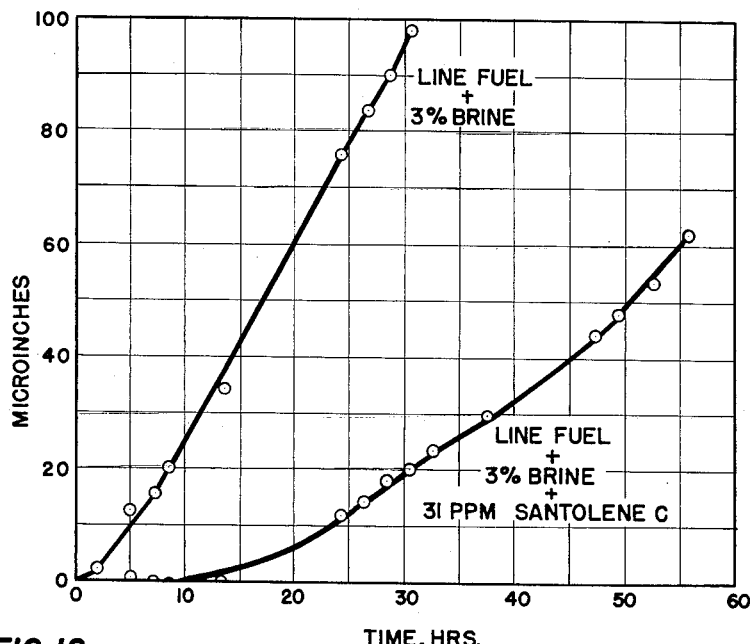
Figure 13:
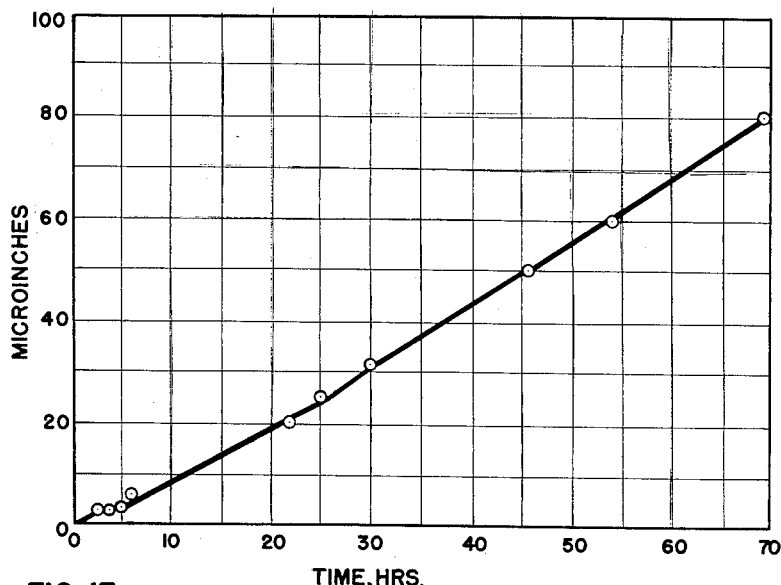

FIGURES 13 and 12 are graphical presentations of experimental data obtained using the corrosion-testing apparatus of this invention.

Figure 2:
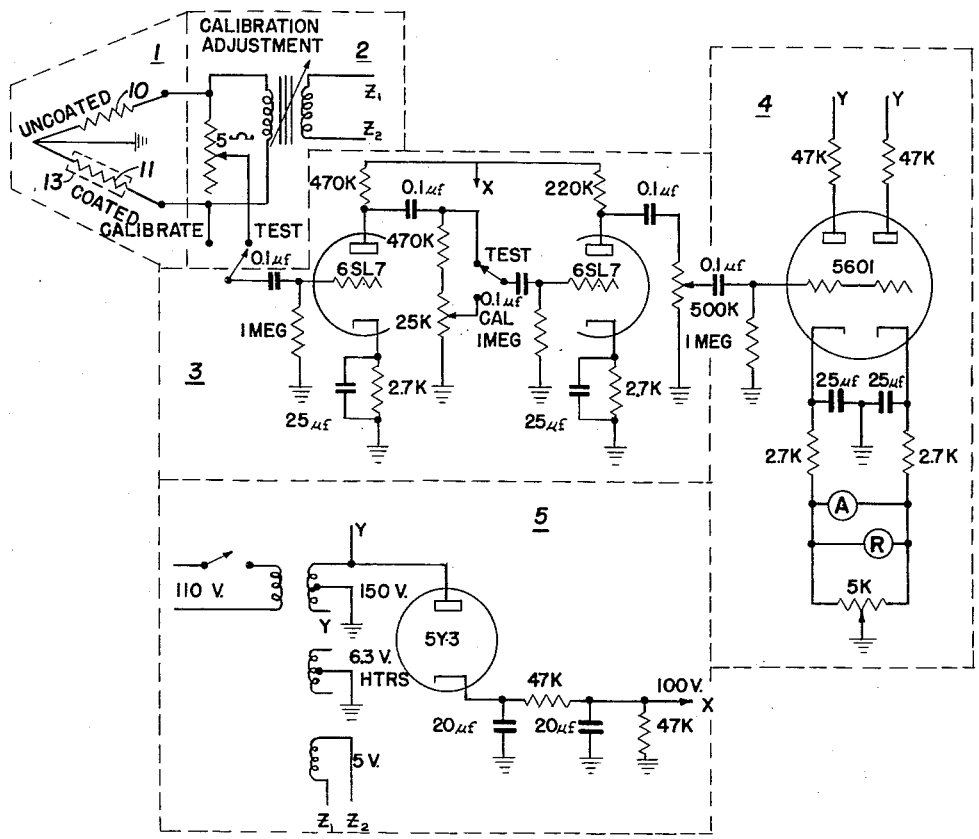
FIGURE 2 is a diagrammatic view of the corrosion-testing apparatus in which the measuring circuit is modified to permit direct reading of the loss of metal thickness caused by corrosion.
Figure 4:
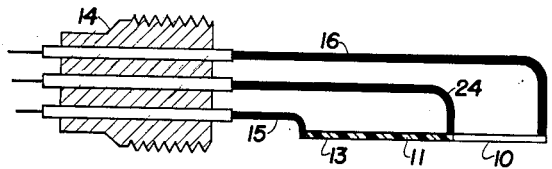
FIGURES 4 through 8 illustrate types of specimen holders which may be employed for installing the test coupons in a process vessel.
Figure 5:
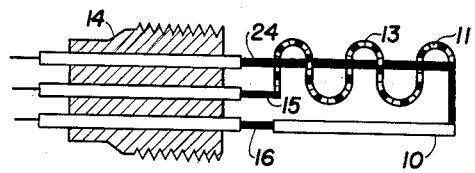
Figure 11:
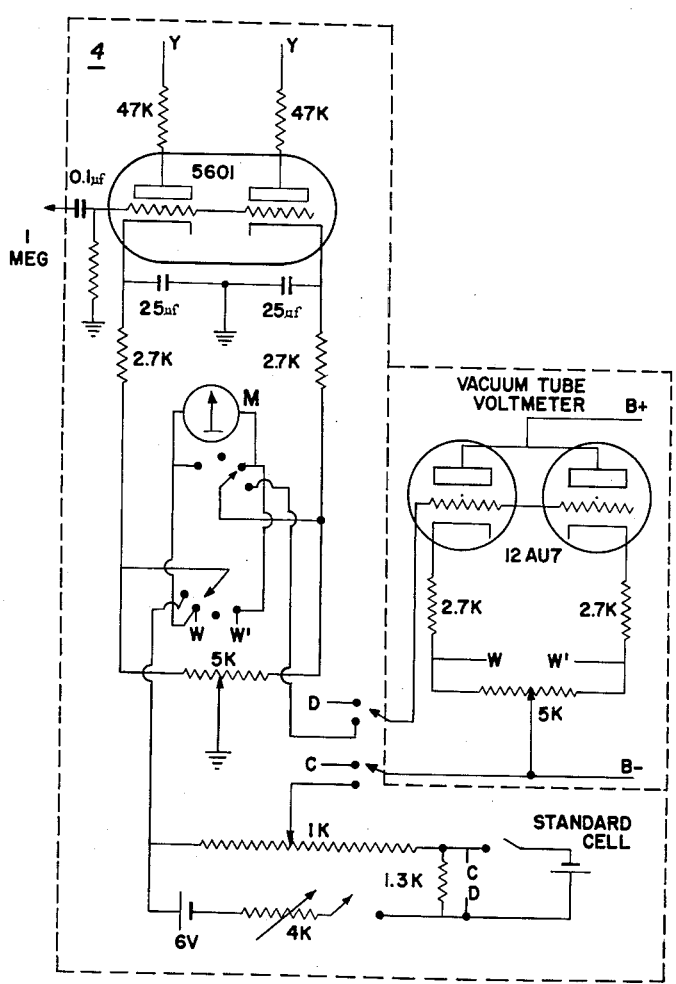

FIGURE 11 shows a circuit modification of the test circuit shown in FIGURE 2 which is employed in using long term corrosion testing units.

This invention will be more fully understood from the following detailed description.

Although resistance measurement as a means for determining the influence of corrosion is known, the method is not widely used because of the need to keep the temperature at a known constant value during the observation. In Table I are compiled resistance values at different temperatures for a coupon of steel, $$0.125'' \times 0.001'' \times 3.0''$$

Also included are the variations in resistance of the original test specimen resulting from the change in conductivity of the specimen due to its having been corroded to a condition which represents a 10% loss in weight.

TABLE I

| Temperature, °F | 0° | 32° | 68° | 85° | 100° | 212° |
|---|---|---|---|---|---|---|
| Uncorroded resistance, ohms | 0.0706 | 0.0807 | 0.0925 | 0.0980 | 0.1030 | 0.1392 |
| Resistance after 10% loss, ohms | 0.0785 | 0.0897 | 0.1029 | 0.1090 | 0.1145 | 0.1552 |

It is seen from these measurements that temperature has such a significant effect on resistance that corrosion studies employing resistance measurements are unreliable unless exact compensation is made for the variations in temperature occurring in the corroding environment. Furthermore, the small changes that occur in the resistance of a corroding specimen preclude ignoring this factor. Accordingly, the instant invention provides a means whereby a self-compensating element is provided which cancels the effect of temperature.

Figure 1:
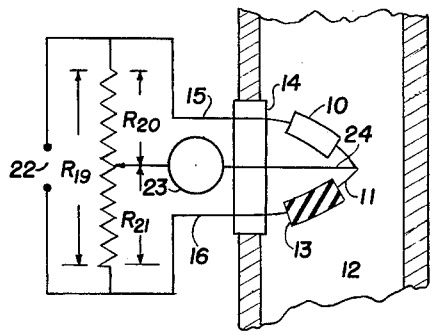
FIGURE 1 is a diagrammatic view of an installation of test coupons installed in a tubular conduit showing the use of a simple bridge circuit for measuring the change in resistance of the corroding coupons and illustrating the compensator feature of the corrosion-testing unit, or probe, of this invention, which automatically adjusts for variations in temperature of the corroding medium.

In the most basic application of our invention, two test specimens of the metallic material of construction under consideration are disposed within the corrosive environment in a suitable specimen holder which permits the specimens to be serially interconnected. One of the specimens is left unprotected while the other specimen is isolated from the corrosive environment by insheathing it with a protective coating, such as a corrosion-resistant plastic, or enclosing it within a corrosive-resistant tubular case, e.g., ceramic tube, to prevent its corrosion. These specimens are serially connected and form separate resistances in one branch of a conventional bridge network. This combination of resistance elements constitutes the corrosion-testing unit, or probe, of this invention and functions as the sensing element for the complete apparatus. The remainder of the bridge network, which, in its simplest form, consists of a second resistance branch in parallel with the other resistance branch, a metering instrument connected across said resistance branches, such as a galvanometer, and a power source, is positioned outside of the corrosive environment at a point which will facilitate the making of observations in the corrosion study. In the second resistance branch, a variable resistance forms the bridge arm opposed to the corrodible specimen exposed to the corrosive environment. This simple embodiment is illustrated in FIGURE 1, where it is seen that test specimens 10 and 11 are installed in an enclosed vessel illustrative of an inaccessible location which does not conveniently permit weight-measurement corrosion testing to be carried out, in this instance a conduit, such as a pipe line. Test specimen 11 in this instance is encased in protective coating 13, such as an epoxy resin exemplified by Armstrong Adhesive A-2, marketed by the Armstrong Products Co., Warsaw, Indiana, which isolates it from the corrosive environment to prevent its being corroded. These specimens, electrically connected in series, are mounted on a suitable base member which is installed in the wall of conduit 12. This combination of elements, which is termed the corrosion-testing unit of the apparatus, or "probe," forms one resistance branch of na electrical bridge circuit. Low resistance leads 15 and 16, which are respectively attached to the terminal extremities of this series arrangement, are interconnected to the other resistance branch of the bridge circuit. In the illustrative embodiment potentiometer 17 is employed to provide the other cooperating resistance element of a conventional electrical bridge circuit, resistance-measuring apparatus. The potentiometer employs sliding contact 18 which divides total resistance $R_{19}$. The separate circuits formed by specimens 10 and 11 are installed within the vessel and resistances $R_{20}$ and $R_{21}$ are connected in parallel with a suitable power source, 22, either A.C. or D.C. A suitable, sensitive, current-measuring meter, such as galvanometer 23, is installed between the resistance circuits interconnecting the intermediate points of the respective resistance circuits by means of conductor 24.

In using the apparatus for corrosion studies, potentiometer 17 is adjusted until current-measuring meter 23 shows no current flowing. At this point the resistance of corroding test speciment 10 may be determined by the following formula:

$$R_{10} = \frac{R_{11} \times R_{20}}{R_{21}}$$

By comparing the resistance measurements thus made with previously prepared, calibrated tables, the loss of weight or loss of thickness caused by corrosion may be readily determined.

To convert resistance measurements to thickness measurement, the following formula would be used:

$$T = \rho \frac{L}{RW}$$

$T$=thickness in cm.
$R$=measured resistance in ohms.
$L$=length of corroding specimen in cm.
$W$=width of corroding specimen in cm.
$\rho$=resistivity of specimen, ohm-cm.

Test specimen 11, encased in protective coating 13, acts to compensate for changes in resistance of corroding specimen 10, where such changes are caused by changes in temperature. Any temperature change brings about a change in the resistance of specimens 10 and 11 in proportion to their individual resistances.

The galvanometer in the bridge arrangements of FIGURE 1 will show no deflection if specimens 10 and 11 are at the same time proportionally increased or decreased in resistance. Therefore, protected specimen 11 compensates corroding specimen 10 for temperature changes. Also, thermoelectric effects at the junctions between the corroding specimen and the leads to the bridge are minimized by the fact that the opposing arm of the bridge, i.e., the protected specimen, has similar junctions exposed to the same temperature as the junctions of the corroding specimen.

Although the apparatus is suitable for use in the simplest form described above, it is preferred that some expedient be provided which will permit the direct reading of loss of metal thickness caused by corrosion without the need for referring to previously calibrated tables. In FIGURE 2 is shown a modification of the measuring network which will permit direct readings to be made.

Complete details of this apparatus are set forth in a co-pending application entitled "Electronic Resistance-Change Meter," filed by Lynn E. Ellison, August 12, 1955, now Patent No. 2,830,265. In view of the details set forth in FIGURE 2, in which values are shown for each of the circuit elements, as well as voltage inputs to the various networks, the manner in which the various circuits of the apparatus cooperatively function will be obvious to one skilled in the art to which it pertains. Therefore, to simplify a description of the instant invention, which is directed to a corrosion-testing unit, or probe, the direct-reading apparatus shown in FIGURE 2 will only be summarily considered. Reference to the drawing will show that the several component circuits of the apparatus have been enclosed by dotted lines, indicating that these are separate networks cooperating one with the other to provide the desired result. Block 1 encloses the corrosion-testing unit, or probe, which is the sensing element of the completed apparatus. This unit forms one resistance branch of an electrical bridge circuit. The other resistance branch is shown in block 2. Any signal which is provided by the sensing element is transmitted to the amplifier circuit shown in block 3, which is suitably coupled to the bridge circuit. This signal, after being properly amplified, is sent to the phase-detecting and measuring network shown in block 4 through a gain control, and impressed on the grid element of the vacuum tube which functions as a grid-controlled rectifier. Direct reading of corrosion rate in microinches is made visibly manifest by the reading produced on meter A, which is an 0–100 microammeter. In the event that a continuous record of corrosion loss is desired, a suitable instrument which may be used for this purpose is a Leeds & Northrup instrument Speedomax Model Number 69800–Q1–742. This instrument is a strip-chart potentiometer recorder having a range of 0–10 millivolts, a 1.5 second full-scale balancing time and a chart speed of about 2 inches per minute. Power for the operation of the apparatus is provided through the circuitry shown in block 5, which shows the various amounts of power which are provided for the several circuits involved.

The probe element, whether used in a simple circuit, such as that hereinbefore described, or in the more complex, direct-reading, bridge-measuring circuits shown in FIGURE 2, comprises a pair of metallic, resistance elements serially connected, and, for convenient installation, mounted in a suitable base member. Both the unprotected as well as the protected resistance elements have the same composition and resistivity characteristics, and preferably consist of a single strip on which is provided an intermediate junction point. However, it is unnecessary that configurations or total resistance of each of the unprotected and protected elements of the corrosion-testing unit, or probe, be identical. Because the corrosion-measuring process in which this invention is employed utilizes a comparison method for determining the change in resistance of the unprotected resistance element when exposed to corrosive conditions, the bridge circuit in which the corrosion-testing unit or probe is installed during use is initially balanced by adjusting the ratio of the resistance elements of the bridge circuit, as previously considered. Accordingly, the preferred arrangement for use in the corrosion-testing units or probes of this invention is to make $R_{10}$ and $R_{11}$ substantially equal and employ a bridge circuit shown schematically in FIGURE 3. This permits the use of a resistance chain comprising resistances 25, 26 and 27 to be substituted for resistance 19 shown in FIGURE 1. In this arrangement more precise balancing of resistance 26 is permitted, with a wider sweep of the movable contact, resulting in greater sensitivity.

Figure 3:
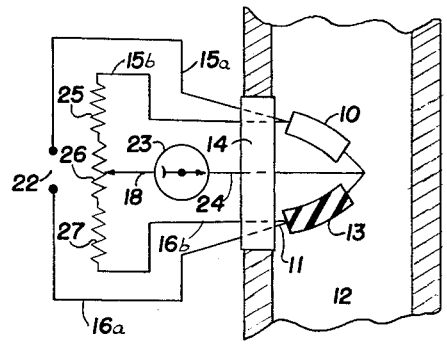
FIGURE 3 is a schematic arrangement of a modification of a basic circuit which can be utilized in carrying out the instant invention.

Although in the construction of the corrosion-testing unit, advantages obtain in utilizing resistance elements, e.g. 10 and 11, which have the same resistance value, suitable unsymmetrical corrosion-testing units can be made in which the resistance elements have different resistance values. It is necessary to be consistent, of course, by employing a material of construction substantially uniform in composition and resistivity as noted above; however, the ratio of the resistance of the unprotected element to the resistance of the protected element, e. g.

$$\frac{R_{unprotected}}{R_{protected}}$$

can vary, in general from about 0.1–10. When a corrosion-testing unit having resistance elements substantially different in their respective resistance values is prepared, corresponding modification of the resistance elements in the other resistance branch of the bridge circuit, e.g. $R_{20}$ and $R_{21}$, will have to be made corresponding to the $$\frac{R_{unprotected}}{R_{protected}}$$

ratio selected. Theoretically, this ratio could vary over wide limits. In practice, however, there are mechanical and electrical factors which have to be taken into consideration in the design of a suitable corrosion-testing unit or probe. For example, lead resistance will be an appreciable factor if a small corrosion-testing unit or probe is made in which the resistance of one element is only about tenth or less of the resistance of the other element. However, lead resistance is not as great a problem in the case of larger unsymmetrical probes in which the resistance of even the smaller resistance element of the probe is large compared with the lead resistance. It is also possible largely to eliminate the effect of lead resistance by interconnecting the corrosion-testing unit in the bridge circuit as shown in FIGURE 3. In addition, mechanical details relating to the assembly of the corrosion-testing unit elements are involved in deciding the practical limits of the $$\frac{R_{unprotected}}{R_{protected}}$$

ratio. In other words, the dimensions of the smaller resistance element must permit the electrical connections to be made.. For example, if $R_{unprotected}$ is 3.0 inches and $R_{protected}$ is 0.3 inch, there will be practical difficulty in attaching a lead to $R_P$.

Another difficulty which occurs in employing an unsymmetrical probe having a very small protected specimen is inadequate temperature compensation. In this instance, a significant part of the resistance of the $R_{protected}$ section of the resistance branch of the bridge circuit could be contributed by a lead or by a connection, e.g., a soldered joint, thereby substantially eliminating the temperature compensating effect provided by the protected resistance element. The foregoing constitute the principal caveats to be observed in the design of an unsymmetrical corrosion-testing unit manufactured in accordance with this invention. Other obvious considerations will be apparent to those skilled in this art which will permit a variety of embodiments to be constructed within the scope of this invention. For example, illustrative and non-limiting variations in probe design for a variety of installations are shown in FIGURES 4 to 10 inclusive.

Figure 6:
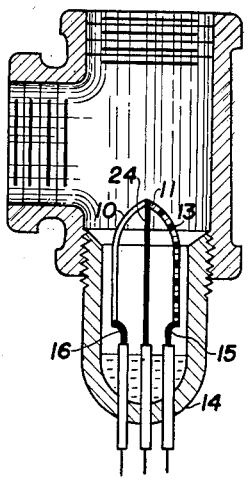

In installing the corrosion-testing unit or probe within an enclosed space, it is desired that the corrosion-testing unit or probe be introduced into the corrosive environment through a small access hole. This can be accomplished by longitudinally mounting the resistance elements, with respect to the longitudinal axis of the base member, as shown the straight-line design of FIGURE 4. Where length of the corrosion-testing unit is to be considered, this objective can be effected by the design of FIGURE 5 where the probe is formed into a spiral. For high pressure tests the corrosion-testing unit may be mounted in a bull-plug, as shown in FIGURE 6.

In the foregoing illustrative embodiments the protected resistance element is isolated from the corrosive environment by employing a protective coating to insheath it. Other expedients to effect this isolation can also be used. These are illustrated in FIGURES 7 and 8. In the corrosion-testing unit shown in FIGURE 7, a conventional pipe plug was employed as base element 14. Tubular case or shield 30 is mounted and sealed in a fluid-tight relationship on a shoulder portion provided in base element 14. Electrical conductors 15, 16, and 24 are coated with an insulating material and passed through suitable openings in base element 14. Resistance elements 10 and 11 consist of a single, foil-llike strip of uniform thickness. The strip is folded into two sections. Conductor 15 is electrically connected to one terminal end of the strip, and conductor 16 is electrically connected to the other terminal end of the strip. Conductor 24 is electrically joined to the strip at the bight. The section to which conductor 15 is affixed and conductor 24 are disposed within the tubular case or shield 30 with the bight portion of the strip resting on the lip of the case or shield. The open end of the case is sealed with suitable closure means 31, such as a cap, or plugged with a sealant such as Saureisen cement, or the like, thereby isolating this resistance section of strip within the case and leaving the other resistance section exposed. The end of unprotected resistance element 10 electrically connected to conductor 15 is positioned adjacent the face of base member 14 and is covered with a protective coating which will adhere to the metallic surfaces.

Another design for a corrosion-testing unit or probe employing a tubular shield or case is shown in FIGURE 8 where glass envelope 35 is employed to enclose the protected resistance element. These illustrative examples are only suggestive and provide basic details which permit the construction of other units embodying the principles of this invention.

While several of the illustrated embodiments use a pipe plug or other similar threaded mounting as the base element, the device can be mounted on other fixtures, such as pipe caps, rubber stoppers, etc., for suspension of the corrosion-testing unit, or probe, in the corrosive environmen. In the fabrication of the corrosion-testing units, or probes of this invention, electrical leads 15, 16 and 24, in extending through base element 14 to which the resistance elements are affixed, are electrically insulated each from the other and the base element. In several of the illustrated corrosion-testing units these leads also function as supports for resistance elements 10 and 11. In these instances the leads are sufficiently rigid to permit their functioning as support elements and are either corrosion-resistant per se or are protected from exposure to the test environment by means of a suitable protective coating, such as that employed in coating the temperature-compensating resistance element of the unit. Furthermore, where isolation of the protected resistance element of the corrosion-testing unit or probe from the corrosive environment is effected by enclosing this resistance element within a tubular case or shield, the case can function as the support means for retaining the resistance elements of the corrosion-testing unit or probe in a longitudinal position with respect to the longitudinal axis of the base member. It is obvious, however, that other support expedients can be employed to retain the coated and uncoated resistance elements in position without utilizing the electrical leads as support means. For example, see FIGURE 7 where resistance elements 10 and 11 are held in a longitudinal position by tubular shield 30 which functions as a support means. The support means illustrated is an electrically non-conducting tube, e.g. glass, ceramic, etc., suitably held in base member 14. The corrosion-testing unit can also be prepared without using a base element, in which instance the resistance elements are simply suspended in the corrosive environment by means of the electrical conductors connecting the unit to the detecting and metering network.

In the appended claims the term "pair" is intended to encompass the cooperating resistance elements of this invention, whether they are prepared from a single unitary strip, such as that shown in FIGURE 7, or separate strips such as that shown in the other figures.

In fabricating the resistance elements of the probe, it is preferred that metal in the form of thin ribbon, sheet or foil be used and that each resistance element have the same thickness. It is necessary to prepare these elements using a high ratio of width to thickness in order that the effect of corrision, which is a surface phenomenon, from the edges of the specimens can be neglected. Accordingly, it is preferred to use foil-like configurations wherein the thickness is 5% or less of the width and preferably 1% or less. If thicker specimens are employed, corresponding losses in accuracy result or unwieldy corrections must be used. In general, the thickness of metal used for the corroding specimen is chosen in such a way that there will be an appreciable fraction of metal lost through corrosion during the desired test period. For example, if the desired test period is a day or less, the thickness may be 0.0005 or 0.001 inch. If the desired test period is a week, the thickness may be 0.005 or 0.04 inch. The latter thickness is about the largest that can be used in the apparatus shown in FIGURE 2. In using a long term corrosion-testing unit or probe it is desirable to be able to increase the sensitivity of the meter. This can be done by increasing the current input to the probe by a factor of two, thereby doubling the sensitivity. Another method would involve adding an additional stage of amplification. A third method would involve incorporating a more accurate means of current measurement, such as shown in FIGURE 13. This can consist of a potentiometric system in which the D.C. voltage that is applied to the meter is also applied to the slide wire of a potentiometer. The indicating control on the potentiometer could be a 10-turn precision control. Instead of reading the 0 to 100 microammeter to an accuracy of 1 microampere (1%), it would be possible to read the potential across the meter to an accuracy of 0.01–0.1%. This degree of accuracy would permit one to carry out short-range tests with a long-term probe.

The resistance elements may be prepared from any solid, electrically conductive material, the selection of which will depend upon the type of system being studied. They may be the same material as that from which the vessel, conduit, tower, or other unit exposed to the corrosive environment was manufactured. However, they may constitute other metallic materials of construction whose corrosibility is under consideration. For example, a conveniently manufactured probe (when steel is to be tested) can be made from shim stock. Other materials include other ferrous alloys and all non-ferrous metals and alloys. Metals of industrial importance that could be used for probes are 3–5% and 9–11% chrome steel; stainless steels such as type 304, type 316 and type 325; the brasses including Admiralty metal; copper; several of the aluminum alloys; and Monel. There are many other metals and alloys which could be tested with the instrument; however, those listed will take care of most cases where the corrosion testing unit of this invention is used.

Because of the difference in conductivity in various metals, it will be important to bear in mind probe size and shape as it is related to the kind of metal. For example, copper, which is more conductive than steel, should be made into a longer probe in order to make sure that it can be handled by the design of the instrument without special modification. In determining the size of the specimens, resistance is another limiting factor from an accuracy standpoint. To avoid the necessity of using expensive instruments of high sensitivity, it is preferred that resistances of the probe elements be between about 0.05–0.2 ohm. However, depending upon the instrumentation, resistances outside these ranges can be used. One of the resistance elements remains exposed; the other is isolated from the corrosive environment by either insheathing it with a suitable protective coating which is corrosion-resistant, or enclosing it in a tubular case or shield.

Although it has been stated in the foregoing description of the apparatus that the preferred protective coating in which the temperature compensator element of the apparatus is mounted is an epoxy resin, any type of protective coating may be utilized which will insulate the surfaces of the temperature-compensating resistance element of the probe from the corrosive environment. Suitable examples of such materials include such proprietary compounds as Tygon paint (American Chemical Paint Co., Ambler, Pa.), Armstrong A–2 Adhesive; Carboline Phenoline 300; Scotchcast Resin–MMM; Sauereisen Cement, which is desirable for high temperature applications; fluorinated ethylene polymers, such as Kel–F and Teflon; polyethylene (these would have to be flame-sprayed); or any corrosion-resistant, non-conducting coating. The coating should be of sufficient thickness to provide complete protection to the coated resistance element during the test life of the corrosion-testing unit, or probe. The coating may be applied by any means, such as spraying, dipping, brush application, etc., amenable to the material which is used. In employing the expedient of enclosing the protected resistance element in a tubular case or shield of desired cross-section to isolate it from the corrosive environment, it is preferred that the case be made of an electrically non-conducting material of construction not affected by the corrosive environment to which it is exposed. Suitable materials include glass, ceramics, plastics such as fluorinated ethylene polymers, polyethylene, etc. Providing precautions are taken to prevent the electrical elements of the corrosion-testing unit or probe, such as the resistance element and electrical conductors, from short circuiting on the walls of the tubular shield, this element can be fabricated from a corrosion-resistant metallic material of construction, such as, stainless steel. Details of constructing a corrosion-testing unit or probe utilizing a tubular case for enclosing the protected resistance element are suggested by the illustrative, non-limiting embodiments shown in FIGURES 7 and 8. To connect the resistance elements of the probe to the remainder of the circuit, a connection is made at an intermediate junction between the corroding and protected parts. Low resistance electrical leads are also attached to the terminal extremities of the resistance. All the junctions are soldered, bolted, or otherwise firmly made and then coated with the protective material, which is applied to the protected part of the metal strip. It is preferable that all of the junctions be made in the same way in order to avoid unequal temperature and other resistance effects. It is of importance to maintain a good insulated coating over all the joints that are exposed to the corrosive environment so as to eliminate the possibility of galvanic action at the connections.

Although in the preferred embodiment of this invention thin, foil-like resistance elements are employed, it is also possible to utilize wires circular in cross-section as the resistance elements of the corrosion testing unit, or probe. In this instance loss in weight due to change in resistivity will have to be determined by a suitable formula, such as the one set forth in "Corrosion Testing Procedures," F. A. Champion, Wiley & Sons, 1952, at pages 238 and 239.

In certain instances, such as laboratory experiments, the resistance elements may be suspended in the corrosive environment by means of the electrical leads. However, it is preferred that integral corrosion-testing units, or probes, be manufactured in a manner which permits them to be inserted through an access opening installed in the metallic system being studied. Accordingly, the resistance elements and their necessary electrical leads can be mounted on a base element which may take the form of rubber stoppers, pipe caps or plugs, bull plugs, or special fittings especially designed for particular installations. The base element can be fabricated from any suitable material of construction. It is only necessary that the electrical leads be electrically insulated from the base member. An important consideration in design, especially for long term probes in rugged service, where the probe may be exposed to the flow of material, is protection of the corrosion-testing unit against mechanical damage. It is not necessary that the full flow of the corrosive agent be available at the probe surface. For this reason, shield 40 of perforated material such as stainless steel as shown in FIGURE 7 is adequate as a mechanical guard. The shield should extend into the base of the probe so that the shield is mechanically separated from the probe elements.

The corrosion measurements are conveniently made by means of the A.C. bridge device shown in FIGURE 2. In conjunction with this apparatus, a corrosion-testing unit, or probe, employing as resistance elements a pair of steel specimens, 0.125" x 0.001" x 3.0", was utilized as one branch of the bridge circuit. These specimens were in the form of a single strip which was folded in two to form the 3" long resistance elements. A type 304, stainless steel, ⅜" pipe plug was employed as the base element. Three longitudinal holes, spaced about 120° apart, were drilled in the base to provide passageways for the electrical conductors, which were prepared from a #14, plastic coated, insulated, copper wire. Coaxially mounted with respect to the longitudinal axis of the base member, in a suitable recess in the face thereof, was a ⅜" O.D. non-porous ceramic tube, 3½" long, which had a wall thickness of about 3/32". Two of the electrical conductors were soldered to the respective terminal ends of the resistance strip, with the third electrical conductor being joined thereto, by soldering, adjacent the bight of the strip. With the bight resting on the lip of the tube, the strip was disposed in a straddle-position with one resistance section being encased in the ceramic tube. The intermediate electrical lead was also contained therein. The terminal end of the exposed resistance section was positioned adjacent the base member face to which was applied Saureisen cement which served to provide a fluid-tight seal between the tube and the base member and a protective coating for the terminal electrical joint between the electrical conductor and the exposed resistance section. The same cement was utilized to seal the open end of the tube, thereby completely isolating the resistance element sealed therein from exposure to the corrosive environment in which the corrosion-testing unit or probe is placed. The other resistance branch of the bridge was formed by an adjustable potentiometer. This was a panel-mounted instrument with a vernier dial to permit accurate resetting.

In using this apparatus, a low voltage (preferably about 0.05–0.1) is impressed across the bridge network. By means of this control, the bridge can be initially balanced, so that at the start of a test the ratio of the resistances of the corroding and protected specimens equals the ratio of the resistances on opposite sides of the potentiometer. This balance is indicated by a zero deflection of the meter in the phase-detecting or metering circuit.

The meter is a 0–100 microampere ammeter incorporated in a vacuum tube, rectifier circuit. By means of the calibration-test switches, the metering circuit can be applied to measure either (1) the unbalance of the Wheatstone bridge (which occurs as a result of increased resistance of the corroding specimen), or (2) the potential across the protected specimen.

The meter is adjusted by means of a gain (sensitivity) control so that a 20% decrease in cross-sectional area of the corroding specimen corresponds to exactly 100 microamperes deflection. For adjustment purposes, it is convenient to substitute a long length of copper wire instead of the short pieces of shim stock. A 10-ft. length of #20 copper wire has about the same resistance as a 3-inch length of 0.001 x 0.125 inch steel shim stock. A 25% incremental resistance, which is equivalent to the 20% decrease in cross-sectional area in one arm, is easily obtained by using a wire that is 25% longer than 10 feet, that is, 12.5 feet.

With the meter circuit in "Test" position, the gain-control is adjusted so that a 25% unbalance results in 100 microamperes deflection. Then the meter circuit is switched to "Calibrate" position and the applied potential is indicated on the meter. The meter reading is in arbitrary units as it is not necessary to know the absolute value of applied potential. In the particular unit shown in FIGURE 2, a reading of 45 on the meter corresponds to the applied potential needed to give a 100 microampere deflection for a 25% change in resistance of the corroding specimen. Thus, the meter reads 100 microamperes for a 10% change in cross-sectional area from each side of the corroding specimen. (This assumes uniform corrosion distribution, and a width larger in comparison to thickness of the corroding specimen.) From this it is seen that when so calibrated, for a 0.001-inch thick specimen, the meter will read 100 after the probe has been reduced in thickness by 10% of 0.001 inch from each side; each microampere corresponds to one microinch loss of thickness.

The applied potential reading needed to give the desired deflection is independent of the initial resistance of the corroding specimen. This can be shown by a mathematical analysis of the Wheatstone bridge. However, the theory was tested quite simply by substituting long copper wire of various gauges, which had resistances of about half or double that used in the initial calibration. In each case, upon setting the applied potential to the proper value (i.e., 45 on the subject unit), an increment of 25% in the resistance of one arm caused exactly 100 microampere deflection.

A large number of probes can be tested with the same A.C. bridge. Each probe is tagged with an identifying number followed by the vernier dial setting corresponding to initial balance with that particular probe.

The stability of the A.C. bridge is excellent; and since the device is built on bridge principles, it is reasonably immune to normal line voltage fluctuations. No precautions are needed against picking up stray currents, but it is necessary to make all connections between the A.C. bridge and the probes with low-resistance contacts.

In testing corrosion with the testing units, or probes, of this invention, as pointed out above, the A.C. bridge is so adjusted that a 25% increase in resistance of the corroding specimen is indicated as a 100 microampere deflection. As there is a reciprocal relationship between resistance and cross-sectional area, this 100 microampere deflection indicates a 20% decrease in average cross-sectional area, or a 10% change in average thickness on each side of the specimen. The edges of the specimen are small by comparison to the width and are neglected in this calculation. When using a 0.001-inch thick specimen, the 100 microampere deflection corresponds to a corrosion loss of 0.001 inch, or 100 microinches. The meter reading therefore directly corresponds to the loss in metal thickness of one side of the corroding specimen, in microinches, for a 0.001-inch thick specimen. For thicker or thinner specimens $$\text{the meter reading} \times \frac{\text{original thickness of specimen}}{0.001 \text{ inch}}$$

$$= \text{metal loss in microinches}$$

To calculate corrosion rates from the meter data, it is necessary to take readings over a period of time long enough to establish two points on the corrosion-time curve. The slope of the line, loss of metal thickness as a function of time, is the corrosion rate. To obtain inches penetration per year it is necessary to multiply the slope in microinches per hour by 0.00875. For a 24-hour run, corrosion rates can be measured as low as 0.0002 I.P.Y. For an 8-hour run, the lowest measurable rate is about 0.0006 I.P.Y.

As a specific application of the subject invention, corrosion data were obtained using the above-described apparatus. These data are graphically presented in FIGURES 12 and 13. On FIGURE 12, data are plotted showing the corrosion of steel alternately exposed to 3% NaCl and gasoline. It is seen that the presence of Santolene C, a proprietary corrosion inhibitor, has a pronounced effect on the slope of the curve (i.e., the corrosion rate). On FIGURE 13, data are plotted for steel corroding in aerated distilled water. These data agreed very closely with actual loss in weight. Because there is no way in which a meter deflection can be obtained without having the corresponding loss in metal, the use of the corrosion-testing units of this invention should be more reliable than the use of actual weighings in weight-loss methods used in corrosion studies.

The principal feature of the instant invention is the elimination of the effect of temperature on the resistance of the exposed specimen. This feature was checked using several different corrosion-testing units, or probes. The probes were "balanced" at room temperature, i.e., the A.C. bridge was adjusted to give zero meter deflection. Then the probes were immersed in an oil bath at 210° F. There was in each case a slight shift off zero, just barely detectable. Next, the probes were corroded in dilute acid until they showed a deflection around 50 microamperes. They were then again immersed in the hot oil and again showed practically no deviation from the room temperature deflection. This set of experiments proved that the resistance of the corroding specimen is adequately temperature-compensated.

In previous corrosin studies by means of the resistance method, it has been found that the results are not reliable if corrosion proceeds beyond 20% of the total thickness of the corroding specimen. Accordingly, it is preferred not to conduct corrosion studies beyond this point to avoid loss in accuracy. However, studies may be continued if necessary recalibrations of the instrument are made and compensations are made for localized attack such as pitting or other aberrations.

While all the tests described above were carried out using intermittent readings made of meter A, it is possible to make a continuous recording of loss of metal thickness v. time by using a millivolt-range, recording potentiometer, R in the meter circuit of the A.C. bridge, as described above. Such instrumentation permits one to study the progress of corrosion continuously while it occurs and is especially useful in cases where there are changes of corrosion rate with time.

In the illustrated embodiments of the invention the resistance measurements were made employing a Wheatstone bridge. This is merely illustrative of one type of comparison method for measuring resistance which may be used. Generally, any A.C. or D.C. bridge circuit of this nature can be used, such as the Kelvin bridge which is desirable because it minimizes the resistance of the leads. It is preferred that 60-cycle A.C. be applied to the bridge, rather than direct current. Besides permitting amplification and calibration of the direct-reading measuring instrument, the use of A.C. also eliminates polarization effects at the probe. If direct current is used, one part of the corroding element becomes anodic to the other part. This influences the corrosion rate of the specimen and also the reading obtained on the meter. To further complicate matters, the polarization effects are variable depending on the solution in which the probe is inserted. This fact alone makes it imperative to use alternating current for continually immersed probes.

The corrosion-testing unit or probe of this invention has a variety of laboratory and field applications either employed per se or in combination with other apparatus. A technique utilizing this latter aspect has been developed which lends itself to a variety of multiphase corrosion tests. A modification of the well-know alternate immersion test, Corrosion Handbook, Uhlig, Wiley at page 965 et seq., this test employs a cylindrical container, rotated or oscillated by a conventional machine. A liquid corroding system is placed in the container and a suitable corrosion-testing unit installed. As the container is agitated, the corrosion-testing unit is alternately immersed in the corroding system and the atmosphere above the system which can be air or other gas to maintain desired conditions. The container can be plastic-lined or glass-lined, and made to withstand super-atmospheric temperatures and pressures. The apparatus can be designed to premit readings to be taken while the apparatus is stopped, or while the machine is in operation. This test was used to study gasoline rust inhibitors such as would be used on ocean going tankers. In these experiments, 450 cc. each of brine and inhibited hydrocarbon were added to a quart glass bottle, leaving a 70 cc. air space. A corrosion-testing unit was inserted and the bottle was oscillated at 3 r.p.m. At intervals of from ½ to 8 hours, depending on the corrosion rate, the corrosion-rate meter described in FIGURE 2 was read to establish the corrosion loss. This technique is more comprehensively discussed in a paper entitled Laboratory Method for Corrosion Inhibitor Evaluation presented at the March, 1956 meeting of the National Association of Corrosion Engineers.

The probe method of this invention is useful in rapidly establishing the corrosion "level" of an installation, classifying metals according to their corrosion resistance, and classifying media according to their relative corrosivities. In this latter case, a resistance method has been in use for some time in measuring the corrosivity of crude oil. The probes described herein permit the extension of this electrical resistance method to other areas. Other applications of the device of this invention include but are not limited to:

*(A) Oil field uses*

(1) In evaluating corrosion inhibitors by flowline testing, the probes of this invention can be adapted to fit onto a standard bull plug. The probes can be installed, and results obtained the same day without removing the probes.

(2) In determining corrosion levels at water treating plants and brine disposal systems, subject probes can be adapted to be entirely submerged in water tanks or treating units, being supported by the test leads.

*(B) Refinery and gasoline plant uses*

(1) In determining alloy resistance in refinery streams, if selective oxidation occurs, it may be difficult to determine by weight loss but is readily accomplished by the electrical resistance method, since both electrical resistance and strength of the specimen depend on the residual metallic core.

(2) In determining relative corrosivity of several refinery runs in which different operating conditions are used, the medium in which the probe is immersed can be of any composition, including gas. For a 24-hour run, corrosion rates can be measured as low as 0.0002 I.P.Y. For an 8-hour run, the lowest measurable rate is about 0.0006 I.P.Y. Successive runs can be made with the same probe to establish the effect on corrosion of plant operating conditions.

(3) In determining gasoline plant corrosion levels, a probe can be installed during a shut-down, reading taken after the plant is on stream, and the probe simply left in place until the next shut-down. The corrosion information is thereby obtained in a fraction of the time needed for coupon testing.

(C) Use in special corrosion problems (1) On ocean-going tankers, the question of relative corrosive conditions during a voyage can be studied by the use of probes at the top, center and bottom of a tank. The course of corrosion can be followed at frequent intervals to establish the relative corrosion rates while the tank is exposed to gasoline, humid marine atmosphere, wash water, drying period, or sea water ballast.

(2) The corrosion rate of lead or other bearing metal can be studied, and continuously recorded, if desired, in the crankcase of an engine being operated in various ways.

It is evident that other modifications in design of the instant invention than those illustrated will be obvious to those skilled in this art. Accordingly, the instant invention is limited only by the express limitations in the appended claims.

Accordingly, I claim as my invention:

1. A corrosion test probe adapted to be inserted in a corrosive environment comprising, in combination, an elongated, corrosion-resistant, sealed vessel, a first metallic test specimen enclosed within said vessel and supported by said vessel in electrically insulated relation thereto, a second test specimen fabricated of a metal corrodible by said environment supported by said vessel in electrically insulated relation thereto adjacent an external longitudinal surface of said vessel, said specimens being in thermal communication through said environment and having similar temperature-resistance characteristics, first and second electrical conductors connected respectively to one terminal end of said first and second test specimens, and a third electrical conductor operatively connected to the other ends of said test specimens, the portion of said third conductor adjacent to said other end lying within said vessel.

2. An apparatus according to claim 1 in which at least a portion of said vessel is composed of electrically insulating material.

3. An apparatus according to claim 2 in which said three conductors pass through and are supported by the base portion of said vessel, and the connections between said test specimens and said conductors lie within the external surface of said vessel.

4. An apparatus according to claim 3 in which said test specimens comprise a single metallic element reflexed to form two test specimens, said third conductor being connected to said specimens at the point of reflex, said element being substantially uniform in thickness, composition, and resistivity.

5. An apparatus according to claim 3 in which said test specimens are foil-like in form and between .0005 and .005 inch in thickness.

6. An apparatus according to claim 1 in which said elongated vessel and said second test specimen are encompassed by a perforated shield supported by said vessel in spaced relationship therewith.

7. An apparatus according to claim 3 in which said vessel comprises a base member adapted to be supported by the structure containing the environment to be tested, and an axially elongated cup-shaped member supported by said member and co-operating therewith to form a sealed enclosure.

8. An apparatus according to claim 7 in which said base member includes an externally threaded portion.

9. A corrosion test probe adapted to be inserted in a corrosive environment comprising in combination, a cylindrical, externally threaded base member, an electrically-insulating, corrosion-resistant, axially-elongated, cup-shaped member supported by said base member and co-operating therewith to form a sealed vessel, a foil-like element fabricated of a material corrodible by said environment and of substantially uniform thickness, composition, and resistivity, reflexed to form first and second test specimens operably supported by said sealed vessel, said first specimen being contained within said vessel and said second specimen being supported adjacent the external longitudinal surface of said cup-shaped member, said specimens being in thermal communication through said environment, first and second electrical conductors connected to the terminal ends of said reflexed metallic element, a third electrical conductor connected to said element at the point of reflex, the portion of said third conductor adjacent said reflex lying within said vessel, said three conductors passing through and being supported by said threaded base member and being in electrically insulated relation therewith, and a perforated sleeve-like shield supported by said base member and encompassing said cup-shaped member and said second test specimen.

References Cited in the file of this patent
UNITED STATES PATENTS

| | | |
|---|---|---|
| 2,315,671 | Tawney | Apr. 6, 1943 |
| 2,398,333 | Shoemaker | Apr. 9, 1946 |
| 2,485,579 | Elliott | Oct. 25, 1949 |
| 2,565,230 | Hebler | Aug. 21, 1951 |
| 2,583,930 | Cotton | Jan. 29, 1952 |
| 2,735,754 | Dravnieks | Feb. 21, 1956 |
| 2,741,119 | Neel | Apr. 10, 1956 |
| 2,851,570 | Schaschl | Sept. 9, 1958 |

FOREIGN PATENTS

| | | |
|---|---|---|
| 872,276 | Germany | Feb. 19, 1953 |